Oct. 13, 1970     L. J. DOWD     3,533,556
TOWER SAFETY CONTROL
Filed Feb. 14, 1969     3 Sheets-Sheet 1
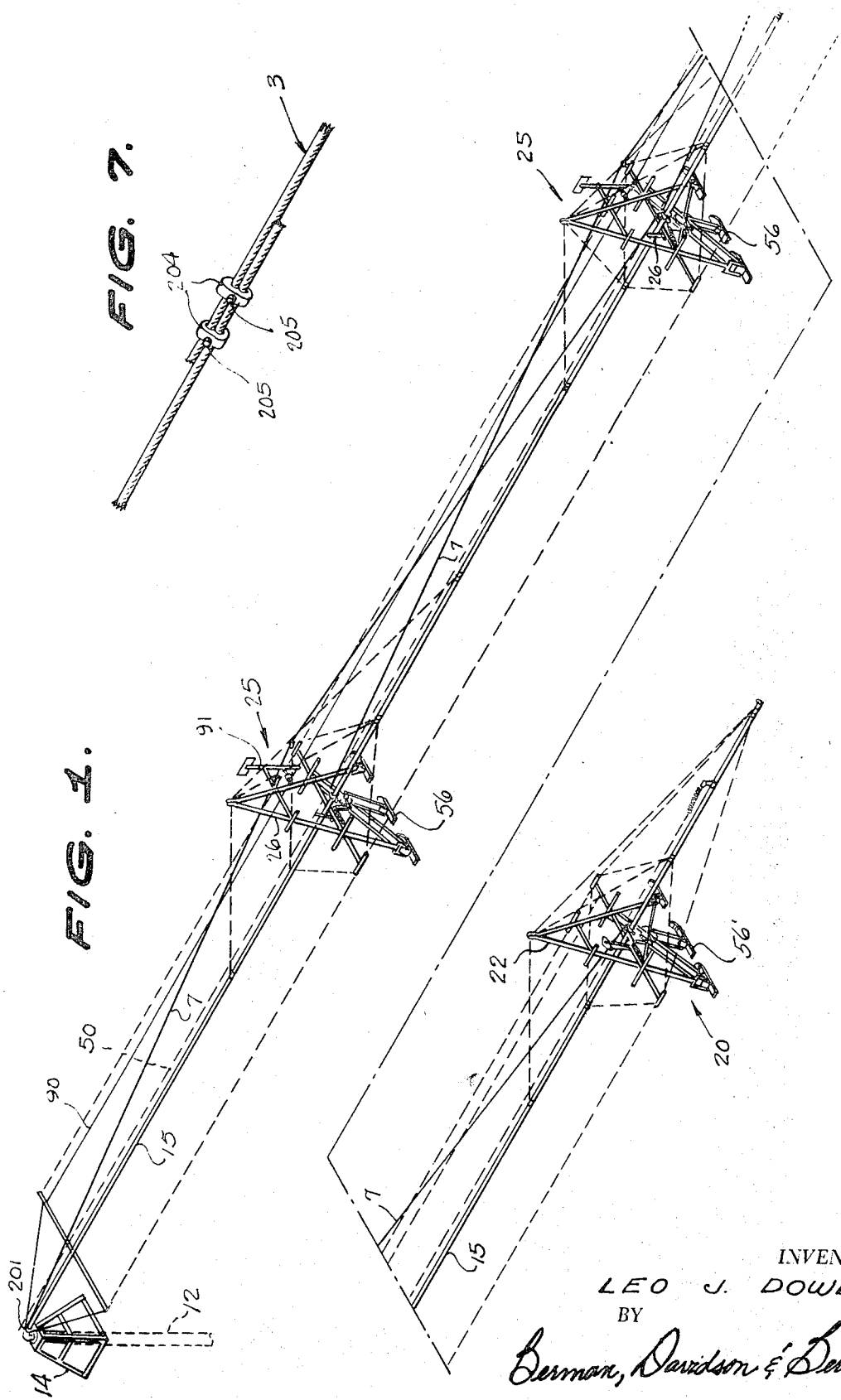
INVENTOR.
LEO J. DOWD,
BY
Berman, Davidson & Berman
ATTORNEYS.

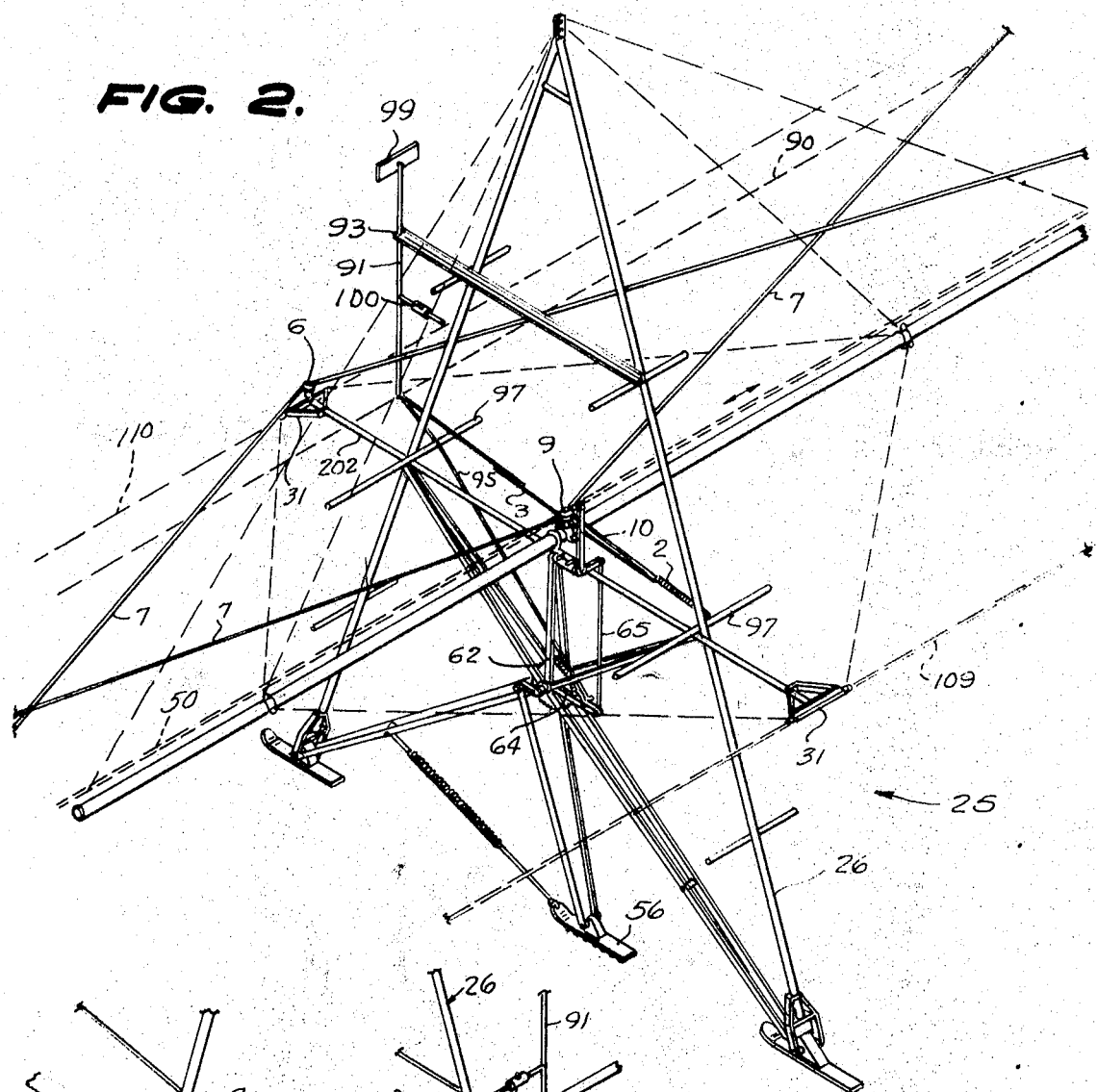
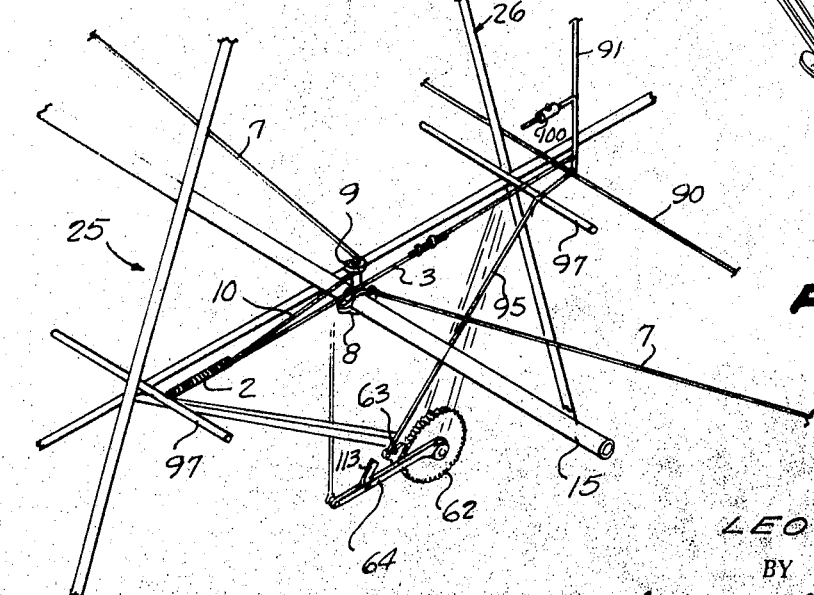

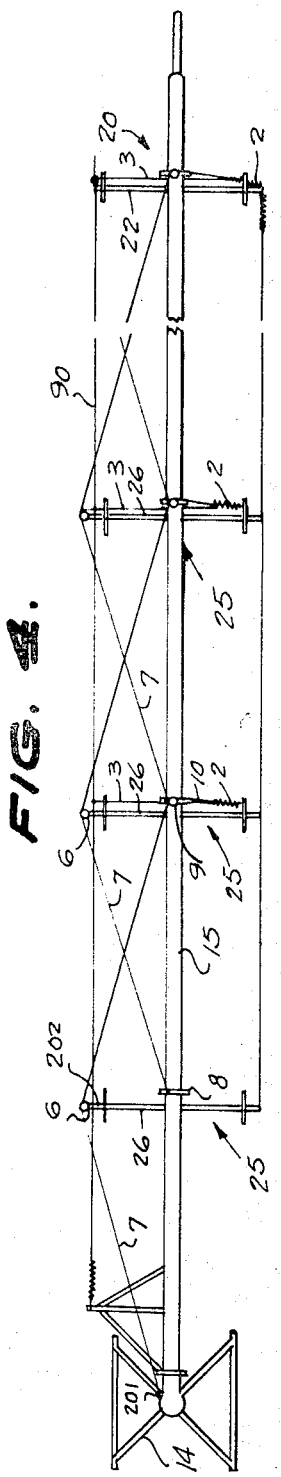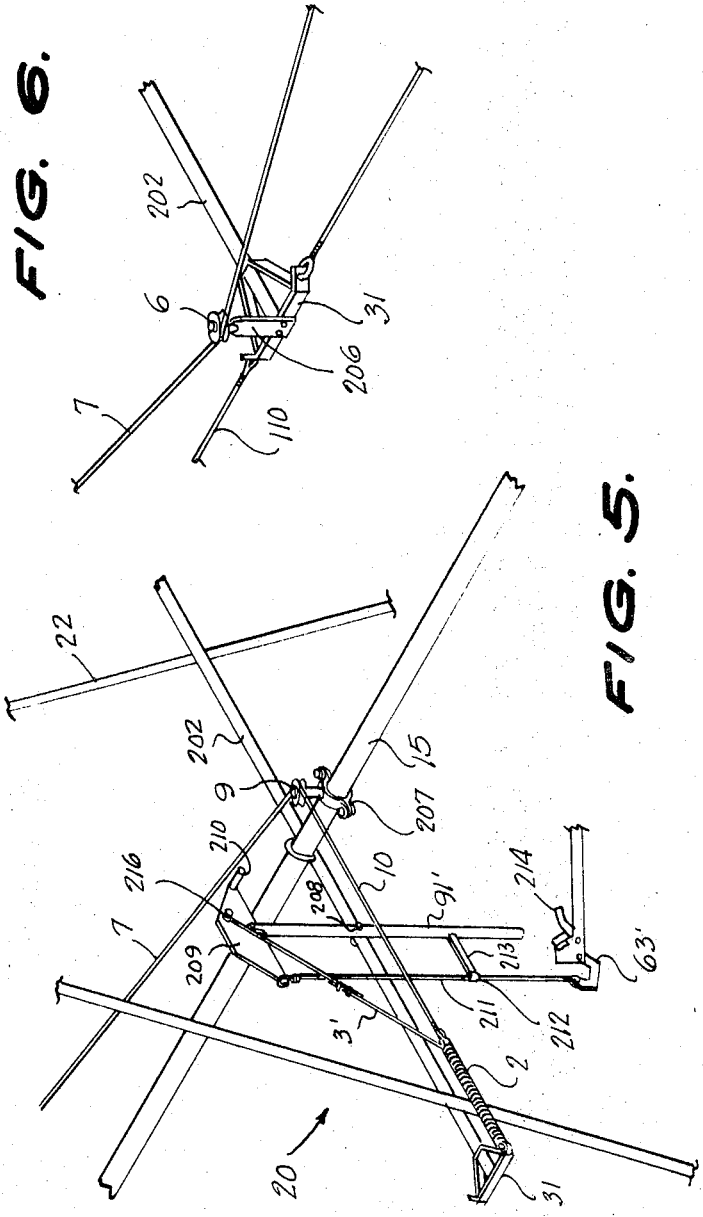

United States Patent Office 3,533,556
Patented Oct. 13, 1970

3,533,556
TOWER SAFETY CONTROL
Leo J. Dowd, 117 S. Parkway,
Columbus, Nebr. 68601
Filed Feb. 14, 1969, Ser. No. 799,390
Int. Cl. B05b 3/00
U.S. Cl. 239—177                                10 Claims

ABSTRACT OF THE DISCLOSURE

A control system for a self-propelled irrigation assembly of the type comprising a plurality of mobile supporting towers carrying an irrigation pipe swivelled to a vertical water supply pipe at one end. The mobile supporting towers are required to maintain substantially radial alignment relative to the water supply pipe. The control system consists of tensioned control cables interconnecting adjacent supporting towers and arranged so that the cable tension changes when an associated tower falls out of alignment with an adjacent tower. The towers are propelled by respective pivoted pawls intermittently-engaging drive wheels on the towers. The pawls are operatively-held in engagement with their ratchet wheels by cables connected to pivoted arms, which are, in turn, connected with the ends of tensioning springs acting on the control cables. When a spring relaxes, the associated pawl-holding cable slackens and this associated pawl is pulled away from driving engagement by a magnet, discontinuing propulsion of the outwardly-adjacent tower, and the reaction continues throughout the system until the complete system has been stopped.

---

This invention relates to self-propelled irrigation systems of the reciprocable cable type, and more particularly to improvements in a control system for stopping the system in case of difficulty.

A main object of the invention is to provide a novel and improved tower control system for a self-propelled irrigation assembly of the type comprising a plurality of mobile supporting towers carrying an irrigation pipe wherein it is necessary to maintain substantially radial alignment of the towers relative to the water supply pipe to which the irrigation pipe is swivelled, the system involving relatively simple components providing improved sensitivity to misalignment of the towers, and employing a minimum number of movable parts.

A further object of the invention is to provide an improved tower control system for a self-propelled irrigation assembly of the above-mentioned type, the control system employing sensing cables which are relatively short as compared to those previously employed and which are, therefore, much more sensitive to misalignment of the towers, as well as being easier to install, more reliable in action, and easier to maintain in proper operating condition.

A still further object of the invention is to provide an improved tower-stopping system for a self-propelled irrigation assembly of the above-described type, the improved system employing relatively inexpensive components, being easy to adjust for optimum sensitivity of response, and being entirely mechanical in its operation, thereby requiring no electrical parts.

Further objects and advantages of the invention will become apparent from the following description and claims, and from the accompanying drawings, wherein:

FIG. 1 is a perspective view, with parts broken away, of a typical self-propelled irrigation system provided with improved tower alignment control means according to the present invention.

FIG. 2 is an enlarged perspective view of one of the intermediate mobile supports forming part of the system of FIG. 1.

FIG. 3 is a fragmentary and somewhat enlarged perspective view, from a different angle of view, of the intermediate portion of the tower of FIG. 2, showing the pawl-drive control cable in its normal taut condition.

FIG. 4 is a fragmentary top plan view of the self-propelled irrigation system of FIG. 1, showing the configuration of the tower alignment control cables employed therein.

FIG. 5 is a fragmentary perspective view, generally similar to FIG. 3, but showing the intermediate portion of the last pipe-supporting tower of the system.

FIG. 6 is an enlarged fragmentary perspective view showing how the control cable engages an outer end portion of one of the intermediate towers of the irrigation system of FIG. 1.

FIG. 7 is an enlarged fragmentary perspective view showing an adjustable splice connection in the ratchet guard control mechanism of each of outer towers of the irrigation system of FIG. 1.

Referring to the drawings, FIG. 1 diagrammatically illustrate a self-propelled irrigation system generally similar to that disclosed in my prior Pat. No. 3,373,939, issued Mar. 19, 1968, wherein the irrigation system comprises a plurality of mobile supporting towers supporting a water-distributing pipe 15, swivelly-connected to a supply conduit 12, the end tower being designated generally at 20 and the intermediate towers being designated generally at 25, the towers comprising A-frames on which the distributing pipe 16 is supported. Thus, the end tower assembly 20 comprises the A-frame shown at 22 and the intermediate tower assemblies 25 comprise the A-frames shown at 26. The respective tower assemblies are provided with driving shoes, consisting of driving shoes 56 for the intermediate tower assemblies and a driving shoe 56' for the end tower assembly 20. These shoes are actuated by a mechanism described in detail in Pat. No. 3,373,939, and include a reciprocating driving cable 50 which oscillates bell-crank levers at the respective tower assemblies, said bell-crank levers being connected by link rods 65, which, in turn, are connected to ratchet drive arms 64 having pivoted pawls 63 drivingly-engageable with respective ratchet wheels 62 or 62', the shafts of the ratchet wheels being, in turn, drivingly-connected to the respective driving shoes 56 or 56'. The pivoted pawls 63 or 63', as described in Pat. No. 3,373,939, can be swung away from driving position under certain conditions.

Thus, as described in prior Pat. No. 3,373,939, the pawls 63 are connected by flexible cables 95 slidably-engaging over longitudinal horizontal bars 97 to the bottom ends of pivoted operator arms 91. The arms 91 are pivoted at 93 and are provided at their top ends with wind vane elements 99. The arms 91 are also provided with biasing weights 100 tending to rotate the arms in a clockwise direction, as viewed in FIG. 2, namely, in a direction to exert tension on their associated flexible cables 95 and thereby bias the associated driving pawls 63 toward driving engagement with the teeth of their associated ratchet wheel 62. In the structure shown in Pat. No. 3,373,939, the biasing weights are located at the top ends of the arms 91 adjacent the wind vanes 99. The biasing weights may be located in any desired position, and in the present invention, the biasing weights are located below the pivotal connections 93, as shown in FIG. 2.

The weights 100 are used merely to offset the pull that each cable 95 exerts on the control cable 90. Thus, after the system is assembled and operating, these weights are used to adjust the alignment of the system. The sensing wire 90, which is held taut by a spring, is the primary alignment-maintaining control element.

The pawl-supporting arms 64 are provided with permanent magnet assemblies 113 which exert magnetic attraction on the driving pawls 63 and which disengage the pawls 63 from the teeth of the ratchet wheels 62 and hold them disengaged responsive to the slackening of the control cables 95. Thus, Pat. No. 3,373,939 discloses a means for automatically temporarily terminating the driving of a tower assembly when it becomes aligned with the other tower assemblies, the control means being operable to activate the ratchet wheel and drive means of an intermediate assembly 25 in accordance with the lagging behind of, and misalignment of said intermediate assembly 25 relative to the end tower assembly 20 or relative to the other tower assemblies. The control means is operable to deactivate the ratchet wheel and dependent drive means of the tower assemblies in accordance with the restoration of the tower assemblies to longitudinal alignment with the outer tower assembly, and other intermediate tower assemblies. The control means of Pat. No. 3,373,939 employs a long flexible actuating cable 90 which extends parallel with respect to the distributing pipe 15, and this cable is operably-connected to the pivoted arms 91 to thereby control the positions of the respective driving pawl members 63.

The safety stop mechanism for the system of Pat. 3,373,939 presents certain disadvantages in that it is relatively cumbersome and does not have sufficient sensitivity. Also, the stop mechanism of Pat. No. 3,373,939 includes electrical control means operating responsive to misalignment of the tower assemblies, and it has been found that such control means can be eliminated and that the system-stopping operation can be made entirely mechanical.

Referring to FIG. 4, it will be seen that the supporting structure for the water distributing pipe 15 begins at the support 14 for the vertical water supply conduit 12. The intermediate towers 25 are then spaced outwardly from the fixed support 14, terminating in the end tower 20. The towers 26 and 20 are intended to be maintained in radial alignment relative to the fixed tower 14.

A first cable 7 is connected at one end, as shown at 201, to the fixed support 14 and passes around a pulley 6 journaled to the top end of a horizontal crossbar 202 (as viewed in FIG. 4), rigidly-secured to and projecting from the intermediate portion of the first tower assembly 25, the flexible cable then passing around a pulley 9 journaled on the A-frame 26 of the second tower assembly 25, the end portion of the cable, shown at 10, being connected to the end of a coiled spring 2. The opposite end of the coiled spring 2 is connected to a longitudinal rod 97 rigidly-secured to the A-frame. When the first and second towers 25 are in radial alignment with the fixed support 14, the cable 7 is under considerable tension and the spring 2 is, therefore, in an extended condition. The inner end of the spring 2 is connected by an adjustable flexible cable 3 to the bottom end of the associated pivoted arm 91, the connection of the cable 3 to the arm 91 being a short distance above the connection of the pawl-control cable 95 to arm 91, as shown in FIG. 3. Normally, when the first and second tower assemblies 25 are in radial alignment relative to the fixed support 14, and the spring 2 is extended, as above-described, the adjustable flexible cable 3 is relatively loose and the pivoted arm 91 is allowed by its control wire 90 to assume a position wherein the pawl-control cable 95 is not held tight, the looseness thereof allowing the pawl 63 to be in non-driving relation with the associated ratchet wheel 62 thus only transmits driving force to the associated shoe 56 through the arm 64, the shaft of the ratchet wheel and the linkage connecting said shaft to the shoe, when misalignment develops, as described in Pat. No. 3,373,939. Driving action takes place intermittently.

If the second tower assembly 25 tends to move faster by an excessive amount than the first tower assembly 25 because of a malfunction of the driving mechanism of the first tower assembly, it will be apparent from FIG. 4 that the flexible cable 7 engaging the pulley 6 of the second tower assembly will loosen, due to the fact that the second A-frame 26 will advance (assuming counterclockwise rotation of the assembly), whereby the first tower assembly 25 lags behind. The loosening of said flexible cable 7 causes the associated spring 2 to contract. Thus, as the spring 2 carried by the second tower assembly 25 contracts, due to the loosening of its associated flexible cable 7, the associated adjustable flexible cable 3 is placed in tension and exerts a pulling force on the pivoted arm 91 to which it is connected.

This pulling force opposes the action of the control wire 90 and the adjustable weight 100 acting on the lever 91 and thereby causes the lever to swing in a clockwise direction, as viewed in FIG. 3. This loosens the associated pawl-control cable 95, causing it to go slack. The associated pawl 63 is thus released and is pulled away from its ratchet wheel 62 by the magnetic force of the associated magnet 113. The pawl 63 is thus disengaged from the ratchet wheel 62, thereby discontinuing the driving action on the associated shoe 56 causing the second tower assembly to stop. This action is successively repeated for the remaining towers, causing the entire system to stop. The system thus pauses until the first tower assembly 26 has been repaired and advances sufficiently to restore the normal tension in the associated flexible cable 7. This normal tension must be sufficient to stretch the spring 2 on the second tower assembly 25 sufficiently to reduce the tension in the adjustable cable 3 so that the control wire 90 acting on the pivoted lever 91 of the second tower assembly can develop sufficient tension in the pawl-control cable 95 to pull the associated pawl 63 away from its holding magnet 113 and cause it to again drivingly-engage with the teeth of the associated ratchet wheel 62. Once the tower that was excessively misaligned, namely, the first one to stop, recommences its progress and gets into alignment, then the towers beyond will commence to function, and this reaction, in turn, will work its way through the balance of the towers, causing the complete system to resume its progress. The towers located inwardly of the defective tower will pause until the defective tower has been repaired and resumes its progress.

FIG. 7 illustrates the structure adjusting the length of a flexible cable 3. As shown in FIG. 7, the cable 3 comprises two segments which are spliced together and locked together by a pair of clamping collars 204, 204, provided with clamping screws 205. The segments are engaged through the collars 204, 204, in side-by-side parallel relationship, as shown in FIG. 7, and at the desired adjusted length of a flexible cable 3, the clamping screws 205, 205 are tightened, locking the segments together.

As described in Patent No. 3,373,939, suitable guide cable means are provided for connecting the A-frame 22 of the end tower assembly 20 and the A-frames 26 of the intermediate supports 25 together and to tend to hold the tower assemblies somewhat in alignment. The guide cable construction includes the cables 110 and 109 disposed on opposite sides of the distributing pipe 15, which extend in parallel spaced relation along the distributing pipe, the intermediate portions of these cables being supported by and including end brackets 31 of the crossbars 202, as shown in FIG. 6. The pulleys 6 are journaled on upstanding post elements 206 rigidly-secured to the brackets 31, as shown in FIG. 6.

As shown in FIG. 4, the above-described tower-stopping safety structure is repeated as between the second tower assembly and the third tower assembly, and so-forth, to the outer end of the system. Thus, a shown in FIG. 4, the next cable 7 is connected to a clamp 8 secured to pipe 15 adjacent to the first tower assembly 25 and extends around a pulley 6 journaled to the forward outer end of a crossbar 202 of the second tower assembly and thence extends to the third tower assembly 25, passing around a pulley 9 and being connected to the end of a spring 2 provided at said third tower assembly. At the third tower assembly, a similar pawl-control arrangement is provided, including an adjustable cable 3 connected to the pivotal arm 91 of the third tower assembly, as above-described, and as illustrated in FIG. 3. The next control assembly comprises an additional flexible cable 7 connected to a pipe clamp 8 at the second tower assembly which passes around a pulley 6 journalled on the forward outer end of a crossbar 202 of the third tower assembly and is thence connected to a spring 2 at the fourth tower assembly in the same manner as above-described. The control action in each case is the same as described in connection with the first tower assembly, namely, causing interruption of driving action on a tower assembly and those spaced outwardly therefrom when it tends to advance too rapidly relative to the next inwardly adjacent tower assembly.

As shown in FIG. 5 at the last tower assembly 22, the associated flexible control cable 7 passes around a pulley 9 journaled on a pipe clamp 207 secured to the pipe 15, and the end portion thereof is connected to the inner end of a spring 2 whose outer end is connected to a bracket 31 secured to the end of the associated crossbar 202. The pawl-controlling pivoted arm is shown at 91', said arm being secured to the crossbar 202 of the end tower A-frame 22 at 208. The top end of arm 91' has a pivoted cross-plate 209 provided with a biasing weight 210 at one end, the other end of the cross-plate 209 being connected by a cable 211 to the associated pivoted driving pawl 63'. The cable 211 passes slidably through the eye 212 of a guide arm 213 secured to the main support arm 91', as shown in FIG. 5, maintaining the cable 211 substantially parallel to the main arm 91'. The weight 210 normally biases the plate 209 in a clockwise direction, as viewed in FIG. 5, causing the cable 211 to urge the pawl 63' in a clockwise direction, namely, to urge its ratchet-engaging end 214 into engagement with the teeth of the associated ratchet wheel, not shown. A magnet, corresponding to the magnet 113 shown in FIG. 3, is mounted on an adjacent portion of the structure in a position to pull the element 214 away from the ratchet teeth when arm 209 is rotated in a counter-clockwise direction, as viewed in FIG. 5, allowing cable 211 to loosen. This occurs in the same manner as described in connection with the intermediate towers 25, namely, by the loosening of the associated flexible cable 7 which allows the associated spring 2 to contract. The inner end of the spring 2 is connected by an adjustable flexible element 3' to the cross-plate 209 at 216, as shown in FIG. 5. Therefore, when spring 2 contracts responsive to the loosening of the associated flexible cable 7, the flexible cable element 3' pulls cross-plate 209 in a direction causing plate 209 to rotate counterclockwise, as viewed in FIG. 5, thereby causing the cable 211 to loosen and allowing the associated magnet to pull the pawl assembly 63' away from the teeth of the associated ratchet wheel. Thus, if the last tower assembly 20 advances too rapidly compared to the rate of movement of the next inwardly adjacent tower assembly 25, its driving pawl becomes uncoupled from its ratchet wheel and remains so until the required normal tension is re-established in its associated flexible cable element 7. When this occurs, the spring 2 of the last tower assembly 20 is extended sufficiently to cause the adjustable cable element 3' to slacken and allow weight 210 to rotate the pivoted plate 209 in a clockwies direction, as viewed in FIG. 5, and thereby restore sufficient tension to the cable 211 to pull the pawl element away from the associated holding magnet and rotate it into driving engagement with its associated ratchet wheel.

As described in the above-mentioned prior Pat. 3,373,939, the supply pipe 15 is provided with a plurality of discharge nozzles spaced therealong which serve to spray water onto the land as the distributing pipe 15 moves or travels about the supply conduit 12 as an axis. The distributing pipe 15, as mentioned in prior Pat. No. 3,373,939, is made up of a plurality of sections of pipe, the sections being fixedly-connected together in a conventional manner, the connections being such as to permit limited flexing of the pipe 15. A suitable pump, not shown, is provided for forcing water from a well or similar source up through the supply conduit 12 and into and out through the pipe 15 to be discharged from its nozzles onto the land underneath.

In the operation, the driving motor associated with the apparatus reciprocates the flexible cable 50, as described in Pat. No. 3,373,939, causing driving force to be transmitted to the ratchet drive wheel of the end tower assembly 20, and the ratchet drive wheels 62 of the intermediate tower assemblies 25. Under normal conditions, namely, when the tower assemblies are maintaining proper radial alignment relative to the supplying pipe 12, the pawls 63' and 63 are in intermittent driving engagement with the ratchet wheels, causing the propelling shoes 56 to move the tower assemblies in steps around the water supply pipe 12 as an axis. As described, when one of the tower assemblies stops through a malfunction thereof, the next outwardly adjacent tower assembly shoe-driving mechanism becomes de-activated by the slackening of the flexible cable 7 attached to the spring 2 thereof. This action occurs outwardly along the entire length of the system at the various tower assemblies thereof, including the end tower assembly 20, causing the entire system to stop. The action of the above-described system thus prevents excessive misalignment of the tower assemblies and thereby protects the water distributing pipe 15 against excessive flexure.

While a specific embodiment of an improved tower alignment-correcting structure for an automatically-controlled irrigation system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a self-propelled irrigation system of the type described comprising an upstanding water supply conduit, an elongated horizontally-disposed water-distributing pipe having one end pivotally-connected to said supply conduit for movement of said distributing pipe about said supply conduit as an axis, a main mobile support disposed transversely of said distributing pipe adjacent the other end thereof and fixedly-carrying said distributing pipe, said pipe having a plurality of discharge nozzles spaced therealong for spraying water onto the land as said distributing pipe moves about said supply conduit as an axis, a plurality of intermediate mobile supports arranged transversely of and at spaced locations along said distributing pipe between said main support and said one end of the pipe, means on each intermediate support supporting the adjacent portion of said distributing pipe, each of said main and intermediate supports being provided with ground-engaging shoes, respective ratchet drive-wheel means on each support drivingly-connected to the propelling shoe thereof, each ratchet drive-wheel means including a ratchet wheel drivingly-coupled to the associated propelling shoe and a pawl member engageable with the ratchet wheel, means to drivingly-oscillate the pawl members, and respective pivoted biased arms on the supports connected to the pawl members and biasing said pawl members toward driving engagement with their ratchet wheels, the improvement comprising means to disengage the pawl member on a support from driving engagement with its ratchet wheel responsive to the lagging behind of the next adjacent support as the supports move about said supply conduit.

2. The self-propelled irrigation system of claim 1, and wherein said means to disengage the pawl member operates in response to the lagging behind of the next inwardly adjacent support.

3. The self-propelled irrigation system of claim 2, and wherein the biased arms are connected to the pawl members by respective flexible cables, said cables being provided with means including said biased arms to hold the cables in tension, whereby to urge the pawl members into driving engagement with their associated ratchet wheels, and wherein said means to disengage the pawl member on a support comprises means to relax the tension in its associated cable responsive to the lagging behind of the next inwardly adjacent support, and means to move the pawl member away from its ratchet wheel responsive to the relaxation in tension of said cable.

4. The self-propelled irrigation system of claim 3, and wherein the means to relax the tension in said associated cable comprises spring means connected at one end to said first-named support opposite the biased pivoted arm thereon, means connecting the other end of said spring means to the biased pivoted arm, means to normally maintain the spring means in an extended condition, and means allowing the spring means to relax responsive to the lagging behind of said next adjacent support, the relaxation of the spring means acting to rotate the biased arm in a direction to reduce the tension in said associated cable.

5. The self-propelled irrigation system of claim 4, and wherein the spring means comprises a coiled spring.

6. The self-propelled irrigation system of claim 4, and wherein the means connecting the other end of the spring means to the biased arm comprises an auxiliary flexible cable member.

7. The self-propelled irrigation system of claim 6, and wherein the means to normally maintain the spring means in an extended condition comprises a further flexible cable member movably-engaging an outer portion of the next adjacent support and connected to said other end of the spring means, said further flexible cable member engaging said outer portion of the next adjacent support in a manner to exert substantial tension on the spring means when the first-named support and next adjacent support are in or near alignment, but to substantially reduce its pull on the spring means when said next adjacent support lags behind the first-named support.

8. The self-propelled irrigation system of claim 7, and wherein said further cable member passes around said outer portion of the next adjacent support and is connected to means adjacent and rigidly-secured to the water supply conduit at a location spaced beyond said next adjacent support relative to said first-named support.

9. The self-propelled irrigation system of claim 8, and wherein said next adjacent support is provided with a main A-shaped frame, said frame having a horizontal intermediate crossbar with an end projecting outwardly from the A-shaped frame, said outer portion of said next adjacent support comprising a pulley mounted on said crossbar end, the further cable member passing around said pulley.

10. The self-propelled irrigation system of claim 9, and wherein the means to move the pawl member away from its ratchet wheel responsive to the relaxation in tension of said first-named cable comprises a magnet mounted outwardly adjacent said pawl member in a position to exert magnetic force thereon and being of sufficient strength to pull the pawl member away from its ratchet wheel in the absence of substantial tension on said first-named cable.

References Cited

UNITED STATES PATENTS 3,373,939   3/1968   Dowd _____ 239—177

LLOYD L. KING, Primary Examiner

U.S. Cl. X.R.

239—212